UNITED STATES PATENT OFFICE.

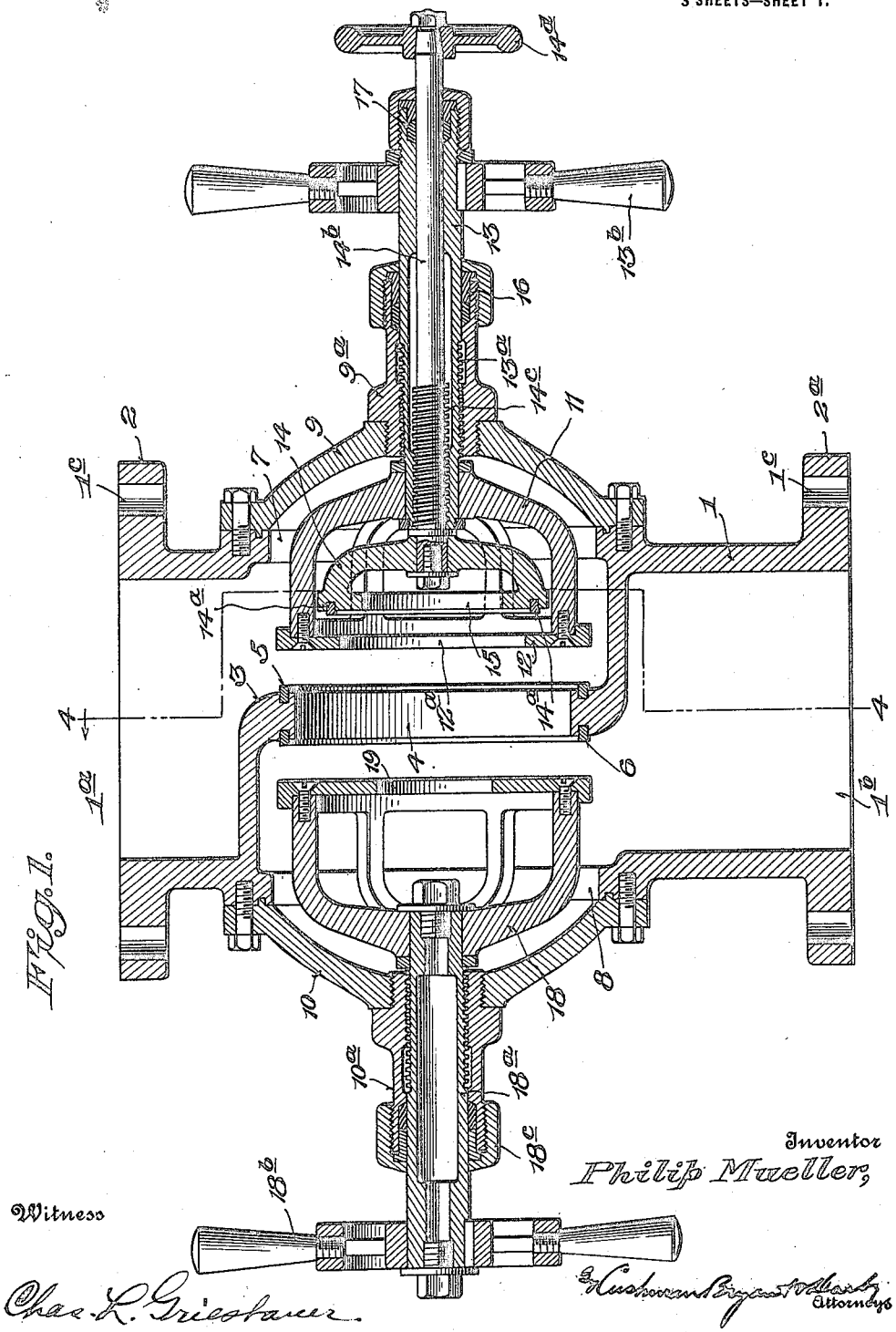

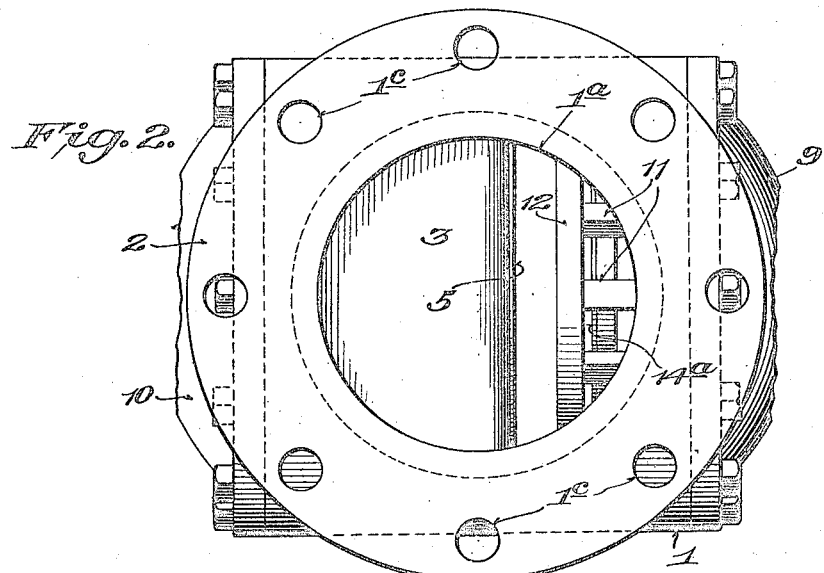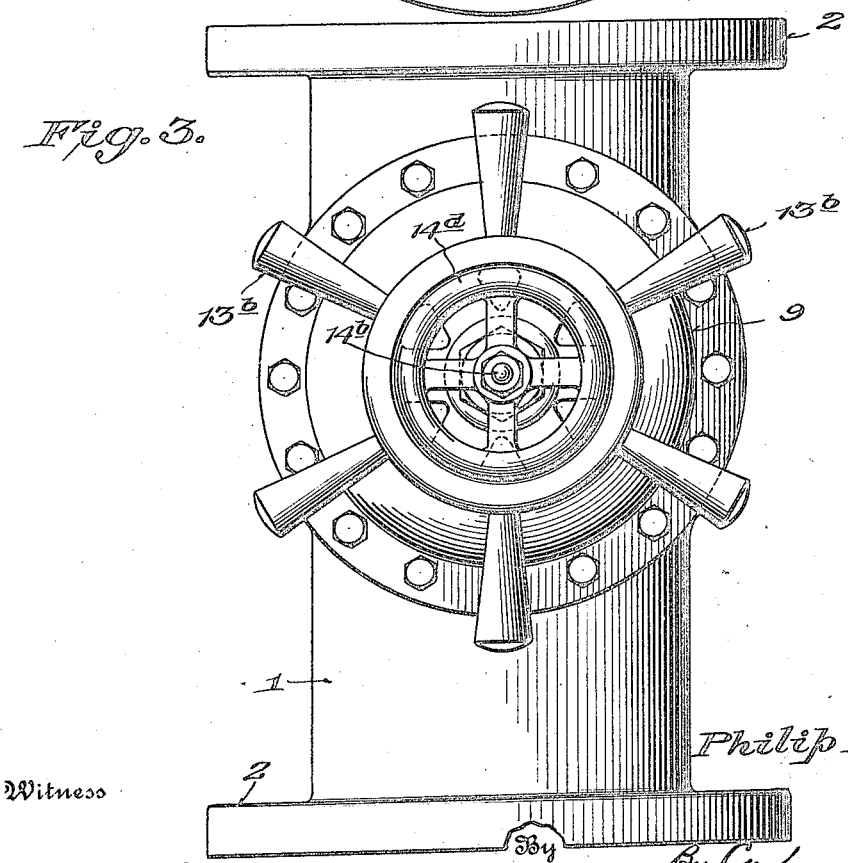

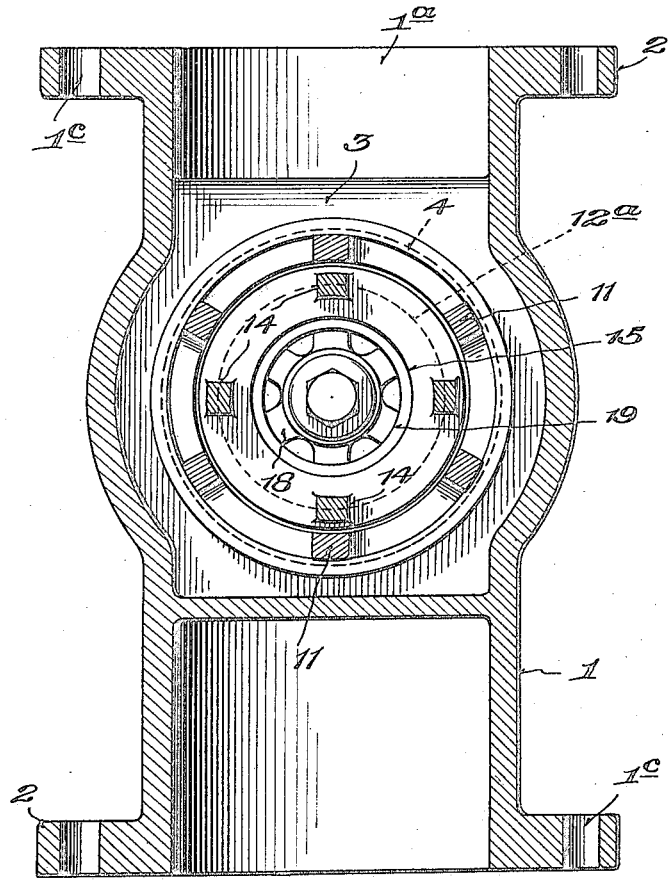

PHILIP MUELLER, OF DECATUR, ILLINOIS, ASSIGNOR TO ADOLPH MUELLER, TRUSTEE, OF DECATUR, ILLINOIS.

MULTIPLE COCK.

1,403,264.  Specification of Letters Patent.  Patented Jan. 10, 1922.

Application filed March 10, 1920. Serial No. 364,678.

*To all whom it may concern:*

Be it known that I, PHILIP MUELLER, a citizen of the United States, residing at Decatur, in the county of Macon and State of Illinois, have invented new and useful Improvements in Multiple Cocks, of which the following is a specification.

The present invention relates to improvements in multiple cocks, especially of that class or type which is adapted for use in connection with water meter testers.

Particularly the present invention is an improvement upon the multiple cock of Letters Patent No. 1,022,375, granted April 2, 1912. The structure illustrated in said patent is not adapted to cocks of large size unless a cock casing of so large a diameter as to be impractical is provided.

The object of the present invention is, therefore, to provide a cock of the character referred to which will be especially adapted for fluid conductors of large diameters, and capable of use in connection with large meter testing machines. By the invention, a cock of this character, having a very large capacity is contained within a casing of minimum size, the several parts being very compactly arranged.

While the invention is particularly adapted for cocks for use with water meter testers, it will be readily seen that the same construction may be satisfactorily employed with machines for testing meters adapted to register the flow of gas or other fluid.

In the accompanying drawings:

Figure 1 is a central transverse section through a cock embodying the present invention.

Figure 2 is a plan view, portions of the casing and the valve operating means being broken away.

Figure 3 is a right hand elevation, referring to Figure 1.

Figure 4 is a sectional view substantially on the line 4—4 of Figure 1.

In the several figures similar reference characters indicate corresponding parts in all of the figures.

Referring to the drawings, 1 designates the main body of the casing which is provided with inlet and outlet openings $1^a$, $1^b$. The casing is adapted to be connected with suitable conduits by bolts extending through passages $1^c$, formed in annular flanges $2^a$ arranged respectively about the inlet and outlet openings. Interiorly the casing is provided with a valve seat member 3 in which is formed an aperture 4 through which the fluid can pass from one side of the partition or diaphragm 3 to the other. As shown, the aperture 4 is formed in a portion of the valve seat member which extends parallel to the longitudinal side walls of the casing 1 and seated in suitable grooves formed in both faces of said valve seat member about the opening 4 are elastic gaskets or rings 5, 6, which project slightly beyond the adjacent face of the member 3 in position to be compressed and form a close, fluid tight, joint with the heads of the valves hereinafter referred to.

Suitable apertures 7, 8, are formed in the side wall of the casing 1, in alignment with the aperture or opening 4 in the valve seat member 3, and over these openings are secured cover members 9, 10, which support the bearings for the valve stems as will be hereinafter described.

Within the casing 1, between the valve seat member 3 and the head 9 is arranged a valve member comprising a head, formed by a spider-like body 11 and a face plate 12, and a stem 13 that extends through a bearing sleeve $9^a$ connected with the head 9. As shown, the valve stem 13 is tubular and provided with an exterior threaded section $13^a$ that engages a thread in the bearing member $9^a$ so that when said stem is rotated by manipulation of the wheel handle $13^b$, the valve will be moved toward and from the valve seat member 3 and, if desired, the face plate 12 thereof caused to bear closely against the gasket 5. An opening $12^a$, which is coaxial with, but of less area than, the opening 4, is formed in the face plate 12 so that when the valve is adjusted to position against the valve seat the size of the fluid passage through member 3 will be considerably reduced.

Within the spider-like body 11 of the aforesaid valve is arranged a second, similarly constructed, valve 14, the aperture 15 in which is surrounded by a gasket $14^a$ which is adapted to be positioned against the face of the plate 12 of the first said valve about the aperture therein by suitable manipulation of a stem $14^b$. The stem $14^b$ extends through the tubular stem 13 of the first said valve, and has a threaded section 14ᶜ engaging an interior thread of the stem 13 so that by rotating the stem 14ᵇ the valve attached thereto may be moved to and from engagement with the plate 12 of the first said valve. The aperture 15 of the inner valve is co-axial with, but of considerably less area than the aperture 12ᵃ, so that when the plate 12 is positioned against the valve seat member 3, and the valve 14 adjusted to cause the gasket 14ᵃ thereof to bear closely against the plate 12, the fluid passage through the valve seat member will be still further reduced. Rotation of the valve stem 14ᵇ is effected by a hand wheel 14ᵈ secured to the outer end of said stem. Suitable stuffing boxes 16, 17 are provided about the valve stems 13, 14ᵇ, to effectively prevent the escape of fluid from the casing. Within the chamber at the opposite side of the valve seat member 3 from the valves hereinbefore referred to is arranged a third valve 18 of substantially the same form as those before described, but having an aperture 19 which is of considerable less area than those in either of the valves 11 and 14. The stem 18ᵃ of this valve 18 extends through a suitable support 10ᵃ, and is provided with a threaded section engaging a corresponding thread in said support so that by rotating the stem, through the means of the wheel handle 18ᵇ, the valve may be moved to and from a position where its face plate will bear against the gasket 6 in the valve seat member. Stuffing box 18ᶜ is provided to prevent the escape of fluid about the valve stem 18ᵃ.

It is believed that the manner of using and the advantages of the construction hereinbefore described will be readily appreciated. It will be seen that when it is desired to test a meter on a stream of the largest size the several members of the multiple cock will occupy the positions shown in Figure 1, in which there can be a free flow of fluid from one side of the valve seat member 3 to the other through the opening 4. If it is desired to slightly restrict the area of the passage through the member 3, the valve 11 will be adjusted so as to bring its face plate 12 into close contact with the gasket 5 and thus reduce the fluid passage to the area of the opening 12ᵃ. Further reduction of the size of said passage can be accomplished by adjusting the valve 14 into engagement with the plate 12 of the valve 11 and in case still further reduction is desirable, the valve 18 is moved to engage the gasket 6 of the valve seat member 3 when the aperture 19, which is of still less area than those of the other valves becomes the controlling means.

It will be seen that by the arrangement described, a relatively small casing may be employed for a large cock and that variation of the effective fluid passage can be easily effected.

Having thus described the invention what is claimed is:

1. A multiple cock comprising a casing having an interior valve seat member, a valve member movable to and from said valve seat and provided with an aperture of less diameter than that in said valve seat member, a second valve member having an aperture therethrough movable to and from the aforesaid valve member and adapted to partly close the opening through the latter, and means for independently moving said valve members toward and from the valve seat member.

2. A multiple cock comprising a casing having an interior valve seat member, two concentrically arranged, valve members within the casing at one side of the valve seat member, each having an aperture co-axial with and of less area than the aperture in the valve seat member and the aperture in the inner valve member being smaller than that of the other, and means for independently moving said valve members toward and from the valve seat member.

3. A multiple cock comprising a casing having an interior valve seat member, two, concentrically arranged, valve members within the casing at one side of the valve seat member, each having an aperture co-axial with and of less area than the aperture in the valve seat member and the aperture in the inner valve member being smaller than that of the other, a third valve member arranged on the opposite side of the valve seat member from the other valves and having an aperture of less area than that in the valve seat member and different from that of any of the other valves, and means for independently moving each of said valve members toward and from the valve seat member.

4. A multiple cock comprising a casing having an interior valve seat, a valve having an exteriorly threaded, tubular, stem extending through a threaded opening in the casing and a head adapted to cooperate with the valve seat member and provided with an aperture of less area than that in the valve seat member, and a second valve member having its stem extending through that of the first said valve member and its head adapted to cooperate with the head of the first said valve member and provided with an aperture of less area than that in the first said valve member.

5. A multiple cock comprising a casing having an interior valve seat member, a valve member arranged at one side of the valve seat member and having an aperture coaxial with and of less area than the aperture in the valve seat member and a tubular stem that extends through a wall of the casing, a second valve member having an aperture coaxial with and of less area than that of the aforesaid valve member, means for moving the first said valve member toward and from the valve seat member, and means operating within the stem of the first said valve member for similarly moving the second valve member.

6. A multiple cock comprising a casing having an interior valve seat, two valve members arranged on opposite sides of the valve seat member and each having an aperture of less area than the aperture in the valve seat member, the apertures in the valve members being of different areas, means for independently moving the valve members toward and from the valve seat member, and means for reducing the operative area of one of said valve members.

In testimony whereof I have hereunto set my hand.

PHILIP MUELLER.